United States Patent [19]

Feinberg et al.

[11] 4,387,404
[45] Jun. 7, 1983

[54] PROJECTOR TELEVISION TUBE ALIGNMENT MEANS AND METHOD

[75] Inventors: Robert B. Feinberg, Niles; Roy Maskell, Oak Park, both of Ill.

[73] Assignee: Zenith Radio Corporation, Glenview, Ill.

[21] Appl. No.: 295,181

[22] Filed: Aug. 21, 1981

[51] Int. Cl.³ .............................................. H04N 5/645
[52] U.S. Cl. ..................................... 358/237; 358/248
[58] Field of Search ................. 358/237, 238, 239, 248

[56] References Cited

U.S. PATENT DOCUMENTS

| | | | |
|---|---|---|---|
| 2,961,560 | 11/1960 | Fyler | 313/64 |
| 3,369,881 | 2/1968 | Bennett et al. | 65/58 |
| 4,024,579 | 5/1977 | Hergenrother | 358/248 |
| 4,028,580 | 6/1977 | Dougherty | 313/406 |
| 4,274,110 | 6/1981 | Lehnert | 358/237 |
| 4,323,817 | 4/1982 | Vennix | 358/248 |

FOREIGN PATENT DOCUMENTS 997389 7/1965 United Kingdom .............. 358/248

*Primary Examiner*—Howard Britton

[57] ABSTRACT

An article of manufacture comprising a cathode ray tube is disclosed for use in a projection television system. The tube has a funnel and a face panel with a window for receiving a rectangular imaging screen. The projection television system includes tube receptacle means having conjugate means for accepting the tube in proper rotational alignment. The tube according to the invention is characterized by having two pairs of substantially radially oriented embossments on the funnel. The embossments are centered on, and azimuthally spaced one hundred and eighty degrees apart, on a diametrical line about forty-five degrees in counterclockwise rotation with respect to the minor axis of the rectangular imaging screen. The pairs of embossments according to the invention provide for engagement with the conjugate means of the tube receptacle means for proper rotational alignment of the tube in the system.

3 Claims, 6 Drawing Figures

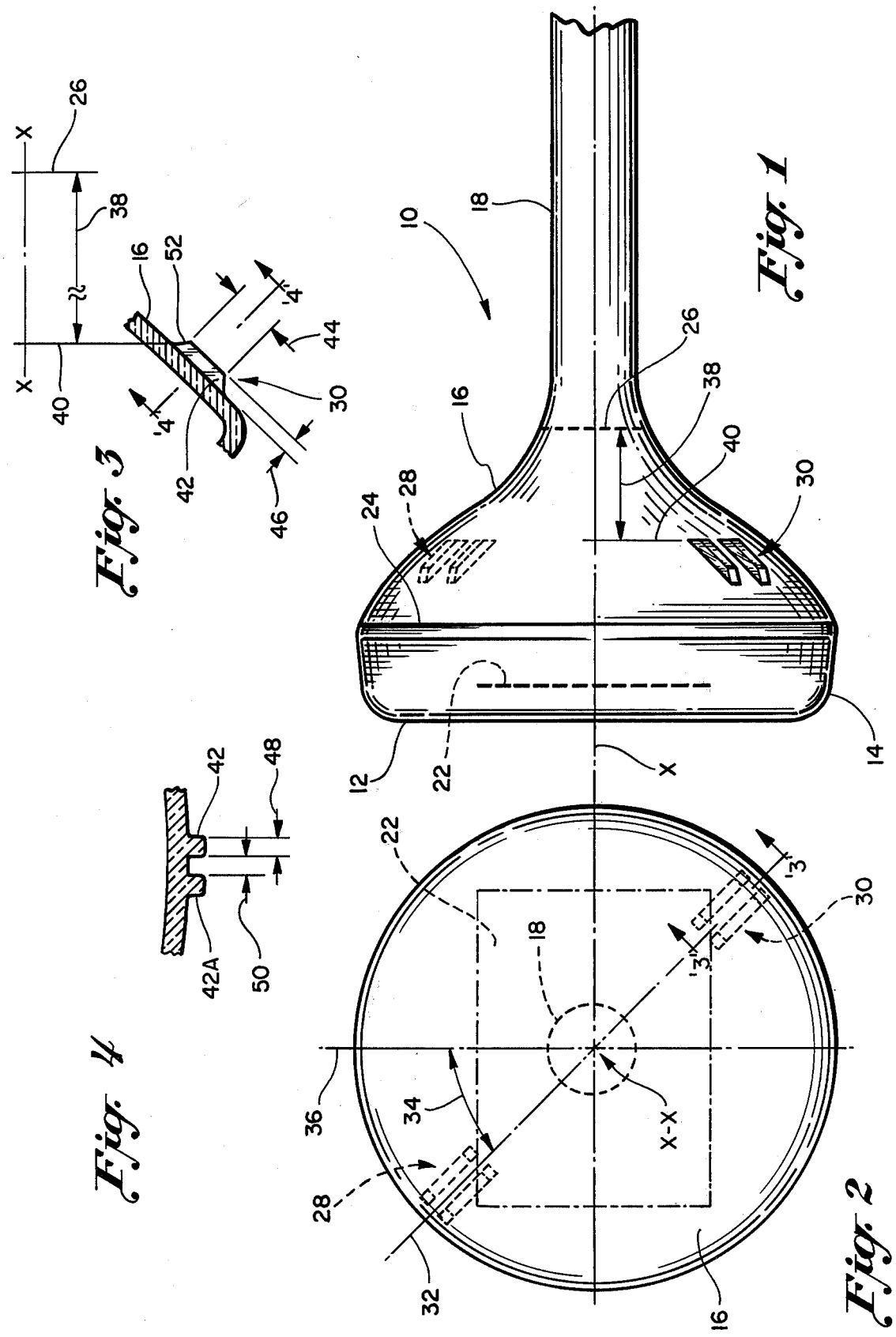

PROJECTOR TELEVISION TUBE ALIGNMENT MEANS AND METHOD

CROSS-REFERENCE TO RELATED APPLICATIONS

This application is related to but in no way dependent upon the following applications of common ownership herewith including: Ser. No. 197,883, filed Oct. 17, 1980, not U.S. Pat. No. 4,342,942, which issued Aug. 3, 1982.

BACKGROUND OF THE INVENTION AND PRIOR ART DISCLOSURES

The present invention relates to cathode ray tubes for projection television systems. More particularly, the invention relates to means and method for conveniently and precisely aligning cathode ray tubes in projection television systems during manufacture and maintenance.

Precision aligning of projection tubes is essential in projection television systems. The television image that is electron-formed on the cathodoluminescent screen is projected a considerable distance onto a viewing screen and enlarged several times in the process. As a result, any appreciable error in alignment of a projection tube is similarly enlarged and amplified in the translation. Also, three discrete projection tubes are commonly used in a color system, and the images projected must appear in precise coincidence on the screen. Any appreciable error in the relative alignment of one or more of the tubes is amplified in projection, resulting in a degraded image on the screen.

Bennett et al in U.S. Pat. No. 3,369,881 discloses a method comprising the preparation of the funnel members and face panel members of cathode ray tubes for optimum alignment and sealing of such parts in the fabrication of tube envelopes. The method comprises the steps of forming complemental viewing panel portions and funnel portions by rectangular cathode ray tube envelopes. Each of the parts is formed with a plurality of external complemental reference protuberances. The reference protuberances on the funnel are used in the alignment of the neck and funnel prior to their conjoinment. Reference summits are ground on the protuberances on each funnel-neck part in accordance with a rotational and lateral alignment of the funnel, and in accordance with an axial alignment of the neck. Each pair consisting of a funnel and a face panel, may be optimally referenced to each other before sealing together by means of the reference summits, using a suitable fixture.

Fyler, in U.S. Pat. No. 2,961,560 discloses a color television picture tube which includes structural assemblies for retaining the aperture mask in a unique position relative to the phosphor dot screen. The major reference points for location of the mask are provided on or adjacent to the viewing end of the bulb. In one embodiment of the invention, cast projections are molded as part of the inner surface and are spaced about the periphery of the viewing end of the bulb. The aperture mask is provided with fittings which cooperate with the locating members. To maintain firm contact of the mask, fittings for the locating member springs are provided.

Faceplate-funnel referencing means are disclosed in U.S. Pat. No. 4,028,580 to Dougherty. A color cathode ray tube is depicted including a shadow mask and improved suspension devices for suspending the mask adjacent the faceplate of the tube. The disclosure stresses channel-shaped studs comprising parts of the suspension devices. Each of the studs has a first portion adapted to be imbedded in the faceplate and a second portion having provision for coupling the stud to the shadow mask. The studs engage reference surfaces on the inside of the funnel when the faceplate and funnel are mated and thereby serve to reference the faceplate to the funnel.

OBJECTS OF THE INVENTION

It is a general object of this invention to enhance the quality of projection television.

It is a less general object of the invention to provide improved means and method for the installation of cathode ray tubes in projection television systems.

It is a more specific object of the invention to provide means and method for facilitating the manufacturing assembly and maintenance of cathode ray tube components in projection television systems.

It is a specific object of the invention to provide means and method for insuring precision installation and alignment of cathode ray tubes in projection television systems.

BRIEF DESCRIPTION OF THE DRAWINGS

The features of the present invention which are believed to be novel are set forth with particularity in the appended claims. The invention, together with further objects and advantages thereof, may best be understood by reference to the following description taken in conjunction with the accompanying drawings, in the several figures of which like reference numerals identify like elements, and in which:

FIG. 1 is an elevational side view of a cathode ray tube having alignment means according to the invention;

FIG. 2 is a plan view of the funnel section of the cathode ray tube shown by FIG. 1 and depicting alignment means according to the invention;

FIG. 3 is a view in section taken along lines 3—3 of FIG. 2 showing additional details of the alignment means according to the invention;

FIG. 4 is a view in section taken along lines 4—4 of FIG. 3 showing further details of the alignment means according to the invention;

DESCRIPTION OF THE PREFERRED EMBODIMENTS

Figure 5:
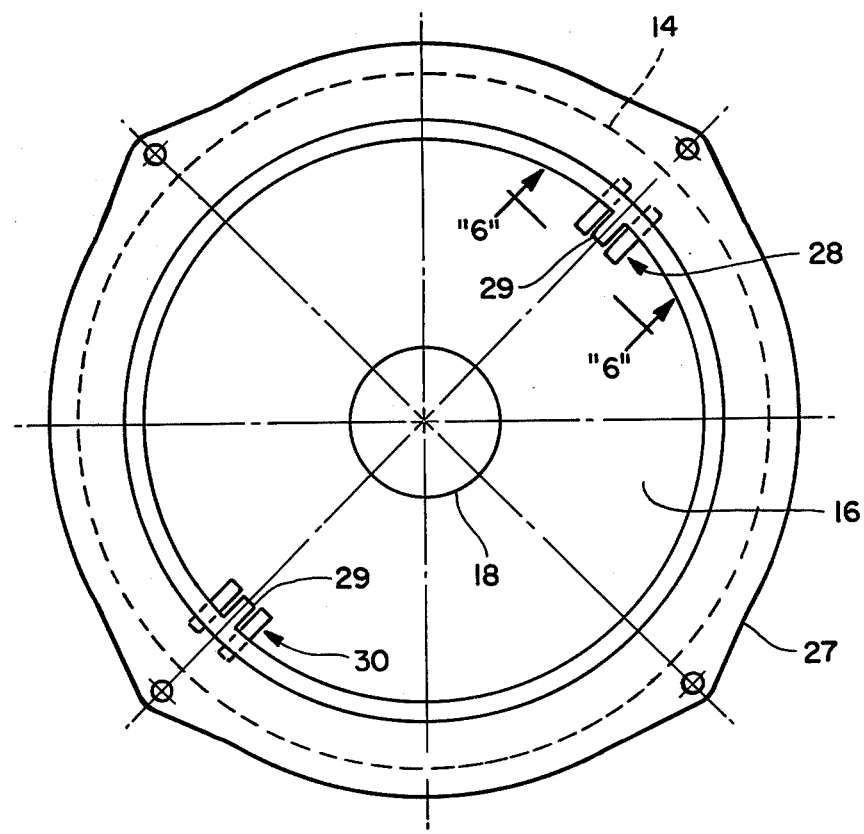
FIG. 5 is an end view of a cathode ray tube receptacle positioned upon the funnel of the tube shown in FIG. 1.
Figure 6:
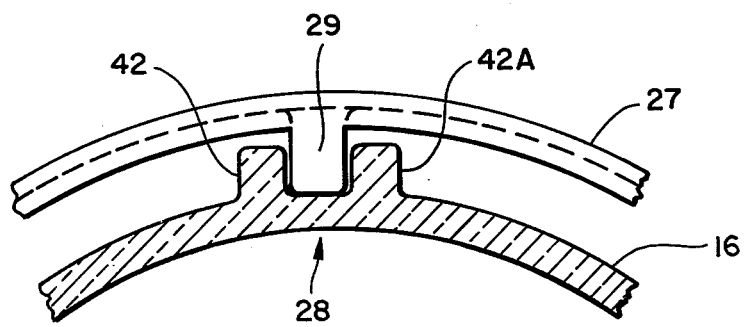
FIG. 6 is a view in section taken along line 6—6 in FIG. 5 illustrating the alignment means cooperation between the tube receptacle and the tube.

A glass cathode ray tube 10 comprises an article of manufacture for use in a projection television system is shown by FIG. 1. Alternately, parts of the tube, such as the funnel, could be made of metal. Tube 10 is depicted as having a face panel 12 shown as being circular with a rearwardly extending skirt 14 conjoined with a funnel 16. A neck 18 is in turn joined with funnel 16. Tube 10 has a window for receiving a cathodoluminescent imaging screen 22 on which a television image is formed by bombardment of an electron gun (not shown). The skirt 14 of panel 12 is mated with funnel 16 along the interfacing funnel seal edge 24, shown as being normal to the axis X—X of tube 10. The face panel could as well be of the skirtless type, in which case the face panel would be joined directly to the funnel.

The tube may be of the type wherein the seal edge of a panel skirt defines a plane whose normal makes a non-zero acute cant angle with respect to the axis of the window, and wherein a funnel seal edge defines a plane whose normal makes a non-zero acute cant angle with respect to the funnel axis. This concept is described and claimed in U.S. Pat. No. 4,274,110, of common ownership herewith.

The electron-formed image appears on the cathodoluminescent having screen 22, indicated in FIG. 2 as being rectangular in shape, and essentially occupies an area on face panel 12 as depicted. The minimum useful screen area for the visible image comprises an area of circular face panel 12 of about three inches by four inches, with a five-inch diagonal, by way of example.

A tube reference line 26, also termed a "yoke reference line," is indicated on tube 10. The reference line 26 is a hypothetical line well known in the art that is established on the funnel 16 adjacent the neck 18 and perpendicular to the axis X—X of tube 10. The line is essentially located a predetermined distance from the center of deviation of the electron gun. The tube reference line 26 is normally established by means of a JEDEC-type gauge designed for the particular size and configuration of the tube. The reference line 26 is primarily used for the proper positioning of the yoke which provides for electron beam deflection. Tube reference line 26 is also used for locating tube elements such as the anode button, alignment marks, and sealing lines. Location measurements are generally made between the reference line 26 and a line perpendicular to the axis X—X which locates the element.

The projection television system includes cathode ray tube receptacle means 27 having conjugate means for accepting the tube in proper rotational alignment.

The tube according to the invention is characterized by having two pairs 28 and 30, preferably identical, of substantially radially oriented embossments formed on funnel 16. The pairs 28 and 30 of the embossments are centered on, and azimuthally spaced 180 degrees apart, on a diametrical line 32 oriented about 45 degrees (ref. No. 34) in rotation with respect to the minor axis 36 of rectangular imaging screen 22; the direction of rotation will be seen to be counter-clockwise as viewed from the funnel end of the tube.

The embossments of each pair 28 and 30 are depicted as being substantially parallel. Each embossment is located about 1.150 inch (ref. No. 38) from the tube reference line 26, as measured between a line 40 extending perpendicular to the tube axis X—X and the reference line 26, as depicted.

Reference is now made to FIG. 3, which is a view in section of a typical embossment 42 (of pair 20) according to the invention taken along lines 3—3 of FIG. 2; and FIG. 4, which is a view in section of embossments 42 and 42A of pair 30, taken along lines 4—4 of FIG. 3. Embossments 42 and 42A, which are identical in all respects to the embossments of pair 28, are about 0.39 inch in length (ref. No. 44), and about 0.120 inch in heighth (ref. No. 46) above the surface of funnel 16, and about 0.120 inch in width (ref. No. 48). Embossment 42 is preferably spaced from its counterpart embossment 42A by about 0.120 inch (ref. No. 50). The ends of embossment 42 (and all other embossments) form a bevel at an angle of about forty-five degrees into the surface of funnel 16, as depicted. The bevel of the embossment nearest the tube reference line 26 will be noted as being at an angle perpendicular to the tube axis X—X.

The novel alignment means according to the invention can be formed during the spin-molding process or pressing process commonly used in the manufacture of glass funnel sections. If the funnel is metal, the embossments can be cast into the metal, or applied as by welding.

The use of two pairs of embossments diametrically opposite provides for positive, unequivocal rotational alignment of cathode ray tubes in a projection system. The conjugate means may be locating "fingers" 29 for example, which are caused to fall between each pair, providing for positive rotational location. The locating of the novel alignment means according to the invention on the funnel provides for alignment not only of the tube in the projection system, but also alignment of the face panel with the funnel, and the alignment of the face panel liquid cooling means or other cooling means, if required. The advantage in having the alignment means on the funnel is that the face panel can be made free of any alignment protruberances which could otherwise interfere with the mounting of a liquid cooling system, for example. In addition, the alignment means according to the invention are valuable in manufacture in that the rotational alignment of the funnel with respect to the face panel can be unequivocally established by suitable fixtures. This factor is especially important in the assembly of off-axis cathode ray tubes according to the invention set forth and claimed in the referent '110 patent.

While particular embodiments of the invention have been shown and described, it will be apparent to those skilled in the art that changes and modifications may be made without departing from the invention in its broader aspects, and therefore, the aim of the appended claims is to cover all such changes and modifications as fall within the true spirit and scope of the invention. The matter set forth in the foregoing description and accompanying drawings is offered by way of example only and is not intended as a limitation. The actual scope of the invention is intended to be defined in the following claims when viewed in their proper perspective based on the prior art.

We claim:
1. For use in a projection television system, an article of manufacture comprising a cathode ray tube having a funnel with a tube reference line and a face panel with a window for receiving a rectangular imaging screen, said system including receptacle means having conjugate means for accepting said tube in proper rotational alignment, said tube being characterized by having two pairs of substantially radially oriented embossments in said funnel centered on, and azimuthally spaced one hundred and eighty degrees apart, on a diametrical line about forty-five degrees in counter-clockwise rotation with respect to the minor axis of said rectangular imaging screen as viewed from the funnel end of said tube, said embossments of each pair being located about 1.150 inch from said tube reference line, and each of said embossments being about 0.390 inch in length and about 0.120 inch in heighth and width, and spaced from its counterpart about 0.120 inch and with the ends beveled at an angle of about forty-five degrees into said funnel, said pairs of embossments providing for engagement with said conjugate means in said tube receptacle means for proper rotational alignment of said tube in said system.

2. For use in a projection television system, an article of manufacture comprising a glass cathode ray tube having a funnel with a tube reference line and a circular face panel with a window for receiving a rectangular imaging screen, said system including receptacle means having conjugate means for accepting said tube in proper rotational alignment, said tube being characterized by having two identical pairs of substantially radially oriented identical embossments in said funnel centered on, and azimuthally spaced one hundred and eighty degrees apart, on a diametrical line about forth-five degrees in counter-clockwise rotation with respect to the minor axis of said rectangular imaging screen as viewed from the funnel end of said tube, said embossments of each pair being located about 1.150 inch from said tube reference line, and each of said embossments being about 0.390 inch in length and about 0.120 inch in heighth and width, and spaced from its counterpart about 0.120 inch and with the ends forming a bevel at an angle of about forth-five degrees into said funnel, said pairs of embossments providing for engagement with said conjugate means in said tube receptacle means for proper rotational alignment of said tube in said system.

3. For use in the manufacturing assembly of a glass cathode ray picture tube for use in a projection television system, said tube including a funnel with a reference line and a circular face panel with a window for receiving a rectangular imaging screen, a method of forming said tube for alignment in said system, comprising:

molding identical pairs of two substantially radially oriented embossments on said funnel;

centering said pairs on, and azimuthally spacing said pairs one hundred and eighty degrees apart on a diametrical line oriented about forty-five degrees in counter-clockwise rotation with respect to the minor axis of said screen, as viewed from the funnel end of said tube;

locating said embossments about 1.146 inch from said reference line;

forming each of said embossments to be about 0.390 inch in length, and about 0.118 inch in heighth and width;

spacing each embossment from its counterpart about 0.116 inch;

beveling the ends of said embossments at an angle of about forth-five degrees into said funnel;

such that said pairs of embossments provide for proper rotational alignment of said tube in said system.

* * * * *